Sept. 3, 1968   A. C. MEIRESONNE   3,399,799
GLASS PARTS FOR FORMING CATHODE-RAY TUBE ENVELOPES
Original Filed Aug. 24, 1966   3 Sheets-Sheet 3
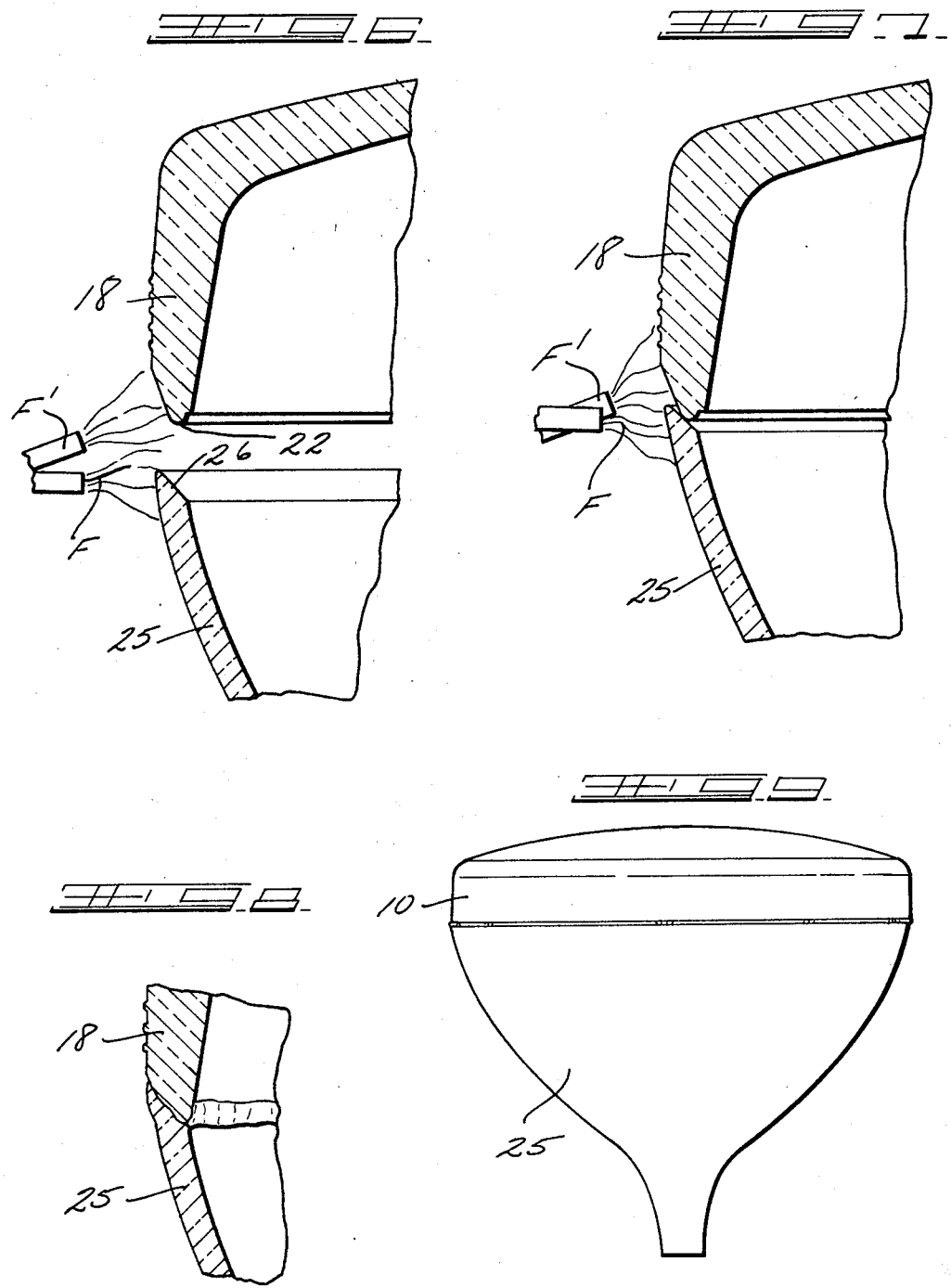
INVENTOR.
ARTHUR C. MEIRESONNE
BY E. J. Holler &
W. A. Schaich
ATTORNEYS though its sealing edge is thicker and facilitates the joining of the parts.

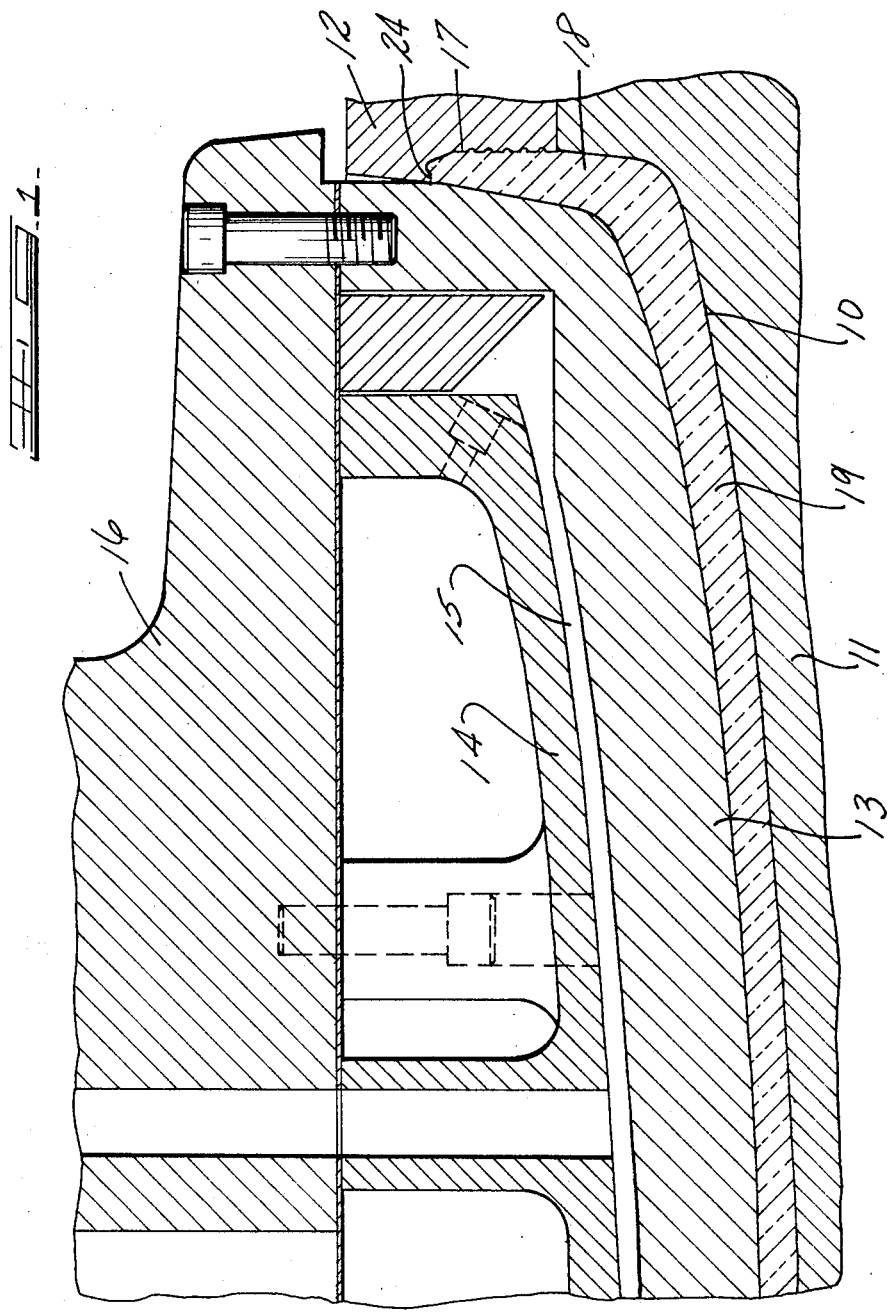

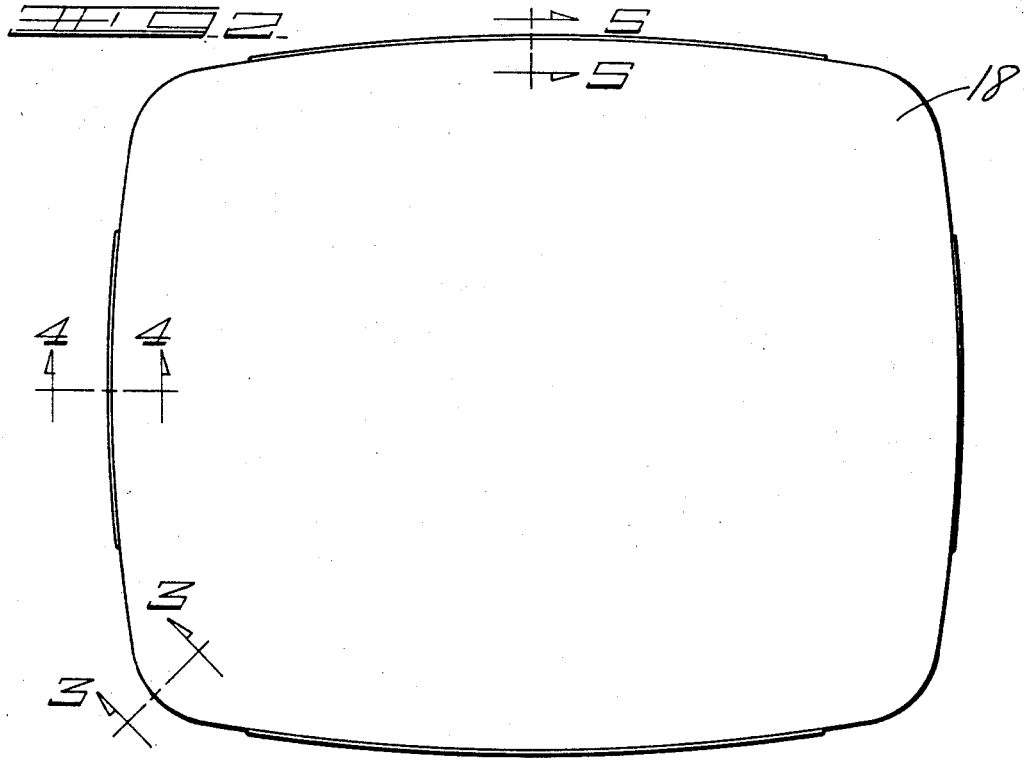
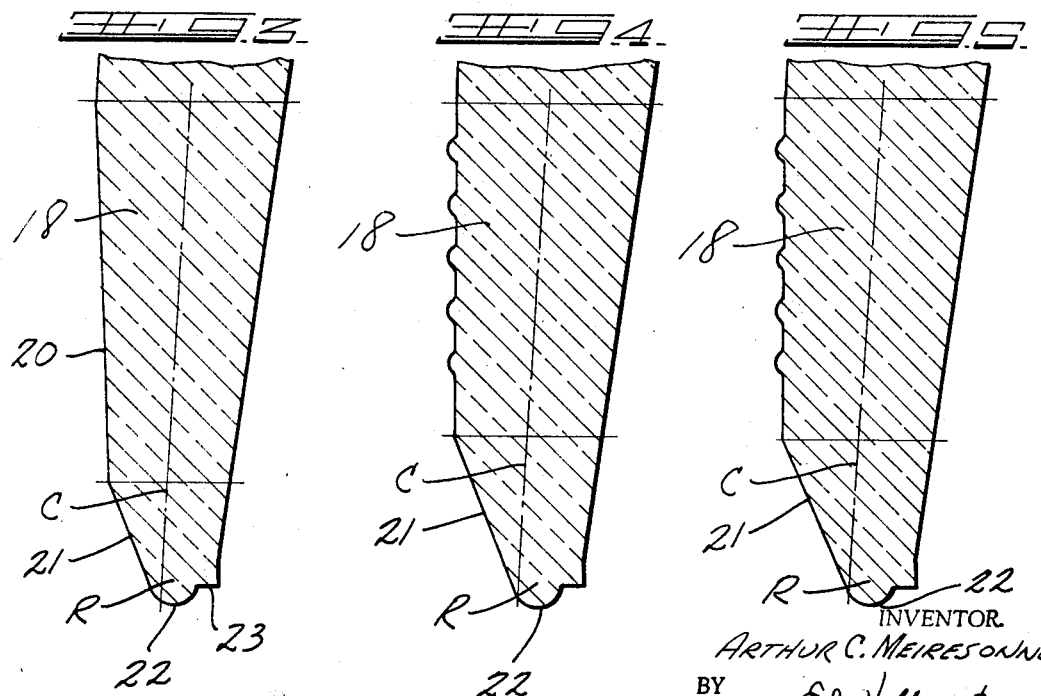

United States Patent Office 3,399,799
Patented Sept. 3, 1968

3,399,799
GLASS PARTS FOR FORMING CATHODE-RAY TUBE ENVELOPES
Arthur C. Meiresonne, Columbus, Ohio, assignor to Owens-Illinois, Inc., a corporation of Ohio
Original application Aug. 24, 1966, Ser. No. 579,448, now Patent No. 3,322,522, dated May 30, 1967. Divided and this application Feb. 20, 1967, Ser. No. 617,304
6 Claims. (Cl. 220—2.1)

ABSTRACT OF THE DISCLOSURE

This invention relates to hollow glass parts, each having a distinctively-contoured annular flange portion adapted to permit improved sealing to another hollow glass part having a complemental sealing surface, such parts being of particular utility in forming cathode-ray tube envelopes and the like.

---

This application is a division of my copending application Ser. No. 579,448, filed Aug. 24, 1966, which was based upon original application Ser. No. 257,458 filed Feb. 11, 1963, and now abandoned. The aforesaid application Ser. No. 579,448 has now matured into the U.S. Patent No. 3,322,522 issued May 30, 1967.

In the manufacture of glass envelopes for use in electronic tubes such as television tubes and cathode-ray tubes of other types, it is conventional to join a hollow glass funnel and a hollow glass face plate. The funnel is conventionally made by centrifugal casting and a sealing edge is formed on the large end of the frusto-conical portion of the funnel by scoring the heated funnel and causing a portion of the end of the funnel to ring off to define the sealing edge on the funnel. The face plate is conventionally made by pressing a charge of glass to form a face plate portion and an annular peripheral flange portion which has a sealing edge defining a substantially flat planar surface. The parts are conventionally joined to one another by placing in a lathe and applying heat to the sealing edges. As soon as the parts are hot enough to show red color, electrical current is introduced to facilitate heating and after proper heating, the parts are brought together while continuing the heating.

Because the sealing edge on the funnel is made by ringing off, glass irregularities are found in the sealing edge and it is necessary to thermally shock the sealing edge of the funnel by applying heat to remove these glass irregularities. Thus, the sealing edge of the funnel, which is also usually thinner than the edge of the face plate, has more heat applied thereto and it is difficult to subsequently heat the sealing edge of the face plate sufficiently to provide a complete and satisfactory joint.

It is therefore an object of this invention to provide a face plate having a novel sealing edge design which facilitates the thermal fusion of the face plate to the funnel.

It is a further object of the invention to provide such a face plate which facilitates the heating of the sealing edge of the face plate and permits a more efficient heating of the sealing edge.

It is a further object of the invention to provide an improved joint between the funnel and face plate.

Basically, the invention comprises forming the flange portion of the face plate such that the sealing edge has the major portion thereof lying on the radially innermost side of the axial center line of the cross section of the flange portion. This results in a small volume to surface ratio at the sealing edge so that the heating rate of the sealing edge will occur more rapidly. Since the major portion of the sealing edge is in the innermost side of the axial center line of the cross section of the flange portion and has a small volume to surface ratio, this edge will initially heat faster, thus taking and conducting the electrical current more readily resulting in heating the sealing edge in a line which is on the innermost side of the axial center line of the cross section of the flange as compared to heating from the outer surface with the conventional design. This provides a better and more efficient hermetic joint between the parts.

In the drawings:

FIG. 1 is a fragmentary sectional view through a molding apparatus for forming the face plate.

FIG. 2 is a plan view of a face plate embodying the invention.

FIG. 3 is a fragmentary sectional view on an enlarged scale taken along the line 3—3 in FIG. 2.

FIG. 4 is a fragmentary sectional view on an enlarged scale taken along the line 4—4 in FIG. 2.

FIG. 5 is a fragmentary sectional view of an enlarged scale taken along the line 5—5 in FIG. 2.

FIG. 6 is a partly diagrammatic sectional view showing the relative position of the funnel and face plate during an initial stage in the sealing of the funnel and the face plate.

FIG. 7 is a view similar to FIG. 6 showing the relative positions of the parts during a further stage in the sealing thereof.

FIG. 8 is a sectional view showing the final joint between the parts.

FIG. 9 is an elevational view of a cathode-ray tube envelope after the funnel and face plate have been joined.

Referring to FIG. 1, the face plate 10 embodying the invention is made in a conventional apparatus by pressing a charge of glass. Such apparatus includes a mold 11 into which the charge of glass is placed, a removable ring 12 and a plunger 13 which is pressed downwardly into the charge of glass and cooperates with the mold 11 and ring 12 to form the charge into the desired shape. The plunger 13 is formed with an interior liquid distributor 14 which provides liquid to cool the interior surface 15 of the mold. The plunger and distributor are mounted on a ram 16.

In accordance with the invention, the interior surface 17 of the ring 12 is shaped to provide a specific configuration to the flange 18 of the face plate 10. The flange 18 comprises a peripheral wall that extends around the face plate portion 19 of the face plate 10.

As shown in FIGS. 3, 4 and 5, the surface 17 is shaped so that the exterior surface of the flange portion 18 includes a first portion 20 tapering slightly inwardly toward the edge of the flange portion 18, a second portion 21 tapering inwardly at a slightly greater angle and a sealing edge 22 comprising a bead which is arcuate in cross section and a short ledge 23 which is needed to provide strength to the portion 24 of the ring 12.

The surfaces 20, 21 are so positioned with respect to the cross section of the flange 18 that the center R of the radius of the bead 22 and, in turn, the major portion of the bead 22 lies radially inwardly of an axial center line C through the cross section 18. Axial center line C is drawn by connecting the centers of the flange cross section between the mold seam, formed by the mold 11 and ring 12, and the area which is distorted in the sealing process. In other words, the cross section of the flange portion 18 is unsymmetrical adjacent the sealing edge with the greater portion of the sealing edge lying radially inwardly of the axial center line through the cross section of the flange portion.

When a flame is applied to the sealing edge, as presently described, the sealing edge will be more readily heated and therefore will reach a temperature such that current will pass therethrough sooner. This permits a better balance of the timing of the heating of the funnel edge and the face plate edge so that a better joint is achieved between the face plate and funnel.

Referring to FIGS. 6–8, the funnel 25 comprises a frusto-conical portion which has a sealing edge 26 at the larger end thereof. The sealing edge 26 is conventionally formed in the funnel by grooving and annularly scoring the funnel after the funnel has been centrifugally cast from a charge of glass and permitting a ring or moil of glass to be broken off of the funnel due to an annular pattern of fracture sources which result in moil separation when the funnel is cooled. The resultant sealing edge 26 is often formed with irregularities that must be removed by thermally shocking the edge of the funnel by application of a flame F (FIG. 6).

The sealing operation is then continued by application of an additional flame F' on the flange portion of the face plate. Conventionally, the second flame F' is not applied to the edge of the face plate until the flame F has heated the sealing edge 26 sufficiently to remove irregularities.

After the heating of the sealing edge of the face plate has been initiated and the parts are heated to a red heat, an electric current is applied as by passage through the gaseous flame, and the sealing edges are then forced together axially as shown in FIG. 7.

The provision of the sealing edge 22 of the face plate radially inwardly of the major portion of the cross-section of the flange 18 of the face plate permits the flame F' to heat the sealing edge more completely and more rapidly so that when the parts are brought together, that part of the sealing edge which is at the highest temperature is radially inward of the major portion of the cross-section thus giving the inner surface of the seal added strength. In addition, the higher temperature of the sealing edge 22 will permit the electrical current to flow through the sealing edge 22 as well as the sealing edge 26 to facilitate the formation of a better joint.

The provision of the tapered surface 21 on the flange portion 18 permits the flame F' to be applied at a right angle to the surface 21 further facilitating the heating of the sealing edge. This may be contrasted to prior art constructions wherein the flame F' was conventionally applied along a radial direction.

The final joint as shown diagrammatically in FIG. 8 provides for a more complete and thorough fusion and is therefore a more perfect hermetic seal between the parts (FIG. 9).

What I claim is:

1. For attachment to a funnel-shaped body to form a cathode-ray picture tube by thermal fusion, a hollow glass part comprising a viewing portion and a peripheral flange portion extending axially away from said viewing portion, said flange portion having an annular sealing edge defining a substantially planar sealing surface, the cross-sectional area of the flange portion adjacent the sealing edge being unsymmetrical such that the major portion of the area thereof lies radially inwardly of a center line extending axially through the cross-section of said flange portion, and a continuous peripheral bead on said sealing surface, substantially the entire cross-section of said bead lying radially inwardly of said center line.

2. The hollow glass part set forth in claim 1 wherein said area of said flange portion adjacent said sealing edge has an outer surface that tapers gradually inwardly away from the viewing portion toward the sealing edge.

3. The hollow glass part set forth in claim 1 wherein said sealing edge includes a substantially flat annular surface positioned radially inwardly of said bead.

4. The hollow glass part set forth in claim 3 in combination with a second hollow glass part having a frusto-conical wall with an annular sealing edge, said sealing edge having been produced by ringing off a moil of glass, the thickness of the sealing edge of said second hollow part being less than the average thickness of the flange portion of the first hollow part.

5. The hollow glass part set forth in claim 1 in combination with a second hollow glass part having a frusto-conical wall with an annular sealing edge, said sealing edge having been produced by ringing off a moil of glass, the thickness of the sealing edge of said second hollow part being less than the average thickness of the flange portion of the first hollow part.

6. The hollow glass part set forth in claim 1 wherein said area of said flange portion adjacent said sealing edge has an outer surface that tapers gradually inwardly away from the viewing portion toward the sealing edge.

References Cited

UNITED STATES PATENTS

| 2,966,997 | 1/1961 | Stutske | 220—2.1 |
| 3,038,096 | 6/1962 | Knochel et al. | |

FOREIGN PATENTS 851,808  10/1939  France.

MARTHA L. RICE, *Primary Examiner.*